(12) United States Patent
Rashkovskiy et al.

(10) Patent No.: US 6,563,536 B1
(45) Date of Patent: May 13, 2003

(54) REDUCING NOISE IN AN IMAGING SYSTEM

(75) Inventors: Oleg B. Rashkovskiy, Cupertino, CA (US); William W. Macy, Palo Alto, CA (US); Ajaya V. Durg, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 09/081,699

(22) Filed: May 20, 1998

(51) Int. Cl.[7] .................. H04N 5/217; H04N 5/225
(52) U.S. Cl. ..................... 348/243; 348/207.1
(58) Field of Search ............... 348/241, 243, 348/246, 247, 607, 615–621, 207.99, 207.1, 222.1; H04N 5/217, 5/225

(56) References Cited

U.S. PATENT DOCUMENTS

| | | | | |
|---|---|---|---|---|
| 4,739,495 A | * | 4/1988 | Levine | 348/247 |
| 4,931,821 A | * | 6/1990 | Hamada et al. | 396/102 |
| 5,047,861 A | * | 9/1991 | Houchin et al. | 348/247 |
| 5,550,935 A | * | 8/1996 | Erdem | 348/241 |
| 5,608,455 A | * | 3/1997 | Oda | 348/243 |
| 5,777,756 A | * | 7/1998 | Hidari | 348/618 |
| 6,005,638 A | * | 12/1999 | Blair | 348/607 |
| 6,061,092 A | * | 5/2000 | Bakhle | 348/243 |
| 6,100,937 A | * | 8/2000 | Dimeo | 348/619 |

* cited by examiner

*Primary Examiner*—Ngoc-Yen Vu
(74) *Attorney, Agent, or Firm*—Trop, Pruner & Hu, P.C.

(57) ABSTRACT

A method includes generating a noise frame of data that is representative of a dark current image. Video frames of data are generated that represent video images. The video frames include noise. Information from the noise frame is used to compensate for the noise.

10 Claims, 8 Drawing Sheets

REDUCING NOISE IN AN IMAGING SYSTEM

BACKGROUND

The invention relates to reducing noise in an imaging system.

Referring to FIG. 1, a typical digital camera 12 uses a rectangular array of pixel sensors 13 to electrically capture an optical image 11. To accomplish this, a shutter (not shown) of the camera 12 momentarily exposes the image 11 to the sensors 13 for a predetermined exposure time. After the exposure, each sensor 13 indicates an intensity of light from a portion of the image 11.

The camera 12 typically processes the indications (provided by the sensors 13) to form a frame of data (which digitally represents the captured image) and transfers the frame (via a serial bus, for example) to a computer 14 for processing. For video, the camera 12 may capture several optical images and furnish several frames of data, each of which indicates one of the captured images. The computer 14 may then use the frames to recreate the captured video on a display (not shown).

Typically, the frame of data does not indicate an exact duplicate of the captured optical image due to imperfections introduced by the camera 12. As examples, the camera 12 may introduce optical distortion and noise. One type of noise may be dark current noise which may be defined as a random noise present in a captured dark image. The noise may be introduced by, for example, the sensors 13.

Circuitry of the camera 12 might be used to compensate for the dark current noise. However, compensation by the camera 12 may present difficulties. For example, circuitry to perform the noise compensation typically increases the complexity and cost of the camera 12. As another example, quite often, in an attempt to cancel out the noise from a particular pixel sensor, the camera 12 may subtract a predetermined noise level from the intensity that is indicated by the sensor. The predetermined noise level might be determined from, for example, an extra pixel sensor that is never exposed to light and might be used to set a predetermined noise level for a group (a row, for example) of the pixel sensors. However, the actual noise present at each pixel sensor might be substantially different from the predetermined noise level and thus, this type of compensation may be inaccurate.

Thus, there is a continuing need for a digital imaging system that reduces the cost and complexity of a digital camera and more accurately compensates for noise.

SUMMARY

In one embodiment, a method includes generating a noise frame of data that indicates a dark current image. Video frames of data are also generated that indicate video images, and the video frames include noise. Information from the noise frame is used to compensate for the noise of the video frames.

In another embodiment, a method includes generating noise frames of data that indicate dark current images. Video frames of data are also generated that indicate video images, and the video frames include noise. The noise frames are time-multiplexed with the video frames to form a video data stream. The stream includes intervals in which at least one of the noise frames is followed in time by one or more of the video frames. The video data stream is received, and for each interval, information from the noise frame is used to compensate for the noise in one or more of the video frames.

DETAILED DESCRIPTION

Figure 1:
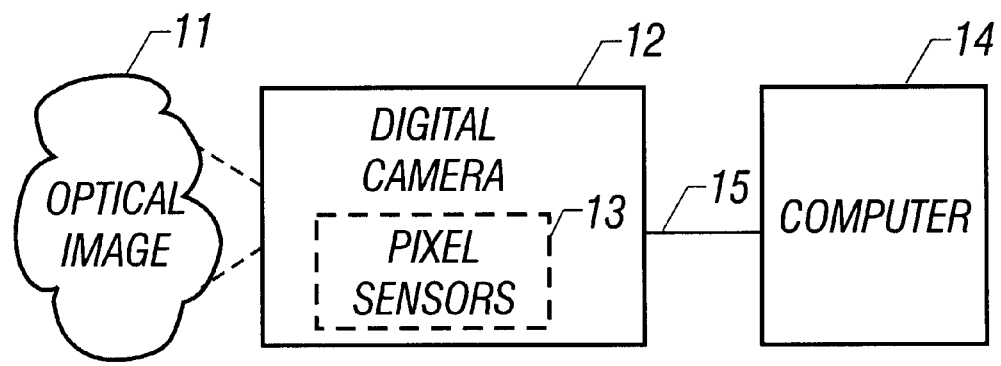
FIG. 1 is a block diagram of a video imaging system of the prior art.
Figure 2:
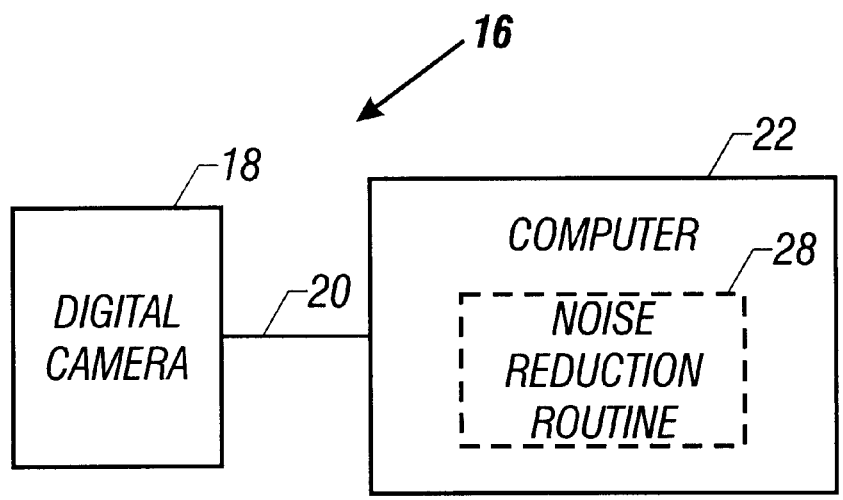
FIG. 2 is a block diagram of a video imaging system according to an embodiment of the invention.

Referring to FIG. 2, an embodiment 16 of a digital imaging system in accordance with the invention includes a computer 22 and a camera 18. The camera 18 successively captures optical images and communicates these images to the computer 22 via a video data stream that appears on a bus 20 (a serial bus, for example). The video data stream includes video frames 26 (see FIG. 3) of data which ideally indicate the respective optical images that are captured at different times by the camera 18. However, the frames of data may also include dark current noise which appears as noise in the images when displayed on the computer 22. To reduce the dark current noise present in the frames, the computer 14, in some embodiments, executes a noise reduction routine 28. The routine 28 causes the computer 14 to use dark current noise information (described below) from the camera 18 to substantially remove the dark current noise.

Figure 3:
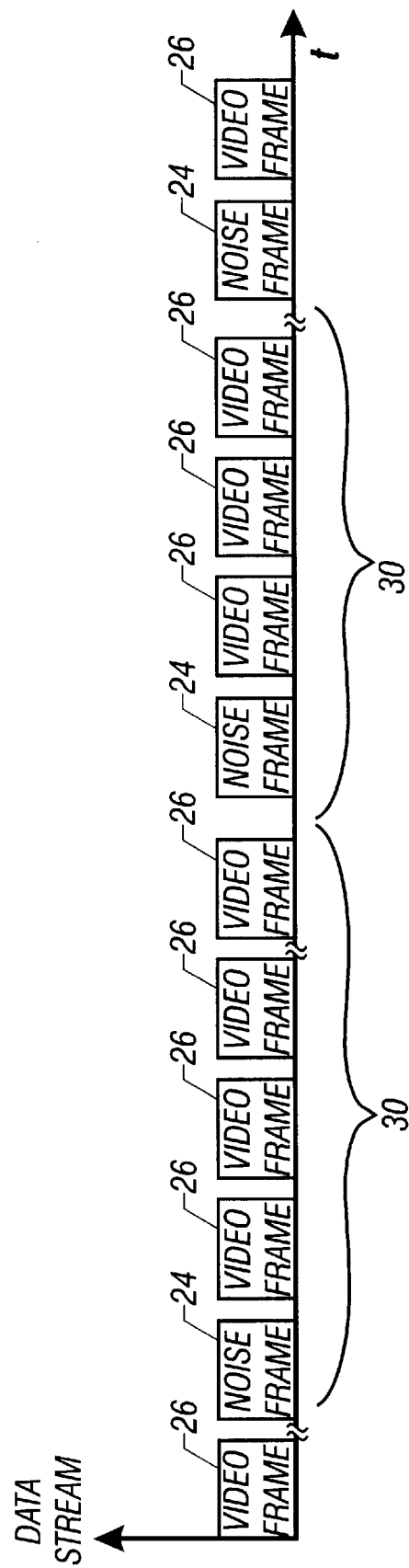
FIG. 3 is an illustration of a video data stream.

Referring to FIG. 3, in some embodiments, the dark current noise information may include noise frames 24 that are communicated from the camera 18 to the computer 22 and are time-multiplexed with the video frames 26. Each noise frame 24 may indicate, for example, a dark current image that is captured by the camera 18, and thus, may include dark current noise that is introduced by the camera 18. Each noise frame 24 includes data which indicates noise intensities that are used to reduce the noise present in pixels of the video frames 26. In this manner, in some embodiments, the noise intensity indicated for a given pixel of the noise frame 26 may be subtracted from the intensity of the corresponding pixel of the video frame 26. However, in other embodiments, this computation is not as straightforward, as described below.

Due to this arrangement, software (the noise reduction routine 28, for example) of the computer 22 (instead of the camera 18) may be used to compensate for the dark current noise. As a result, the cost of the camera 18 may be minimized, and advanced noise reduction techniques may be implemented by the software, as described below.

Still referring to FIG. 3, in some embodiments, the video frames 26 indicate respective, typical video images which are captured by the camera 18. In this manner, the data of each video frame 26 indicates the intensities of pixels of the frame 26. The video images may be recreated and displayed one at a time by the computer 22 to recreate the video captured by the camera 18. Unlike the video frames 26, the noise frames 24, in some embodiments, do not indicate images to be displayed by the computer 22.

Instead, each noise frame 24 indicates pixels of a captured dark current image that is formed by, as examples, closing the shutter of the camera 18 or setting the focus of the camera 18 to infinity. When the shutter of the camera 18 is closed, an array of pixel sensors of the camera are exposed to darkness. As a result, the camera 18 captures an ideally black, or dark image. However, the resultant captured image includes any noise introduced by the camera 18, and thus, the image formed on the array is actually a dark current noise image. Similarly, if the focus of the camera 18 is set to infinity, ideally a dark image forms on the pixel sensors. However, due to the dark current noise, the camera 18 actually captures a dark current image.

In some embodiments, the computer 22 may use information from the most recently received noise frame 24 to reduce the dark current noise present in subsequently received video frames 26. In this manner, the noise frames 24 may be transmitted by the camera 18 at predetermined intervals 30 (twenty second intervals, for example). Each interval 30 includes several video frames 26 which follow the noise frame 24 in time, and the noise frame 24 of each interval 30 may be used by the computer 22, as described below, to reduce dark current noise that is present in the video frames 26 of the interval 30.

Using information from the noise frames 24 to compensate for dark current noise may present some difficulties. For example, although the video frames 26 are received throughout the interval 30, the noise frames 24 are received (in some embodiments) only once per interval 30, and as a result, the noise intensities being used for compensation are updated only once every interval 30. As a result, for a displayed pixel, updating the noise intensity may cause a visually detectable change in the pixel's intensity, as described below.

Figure 4:
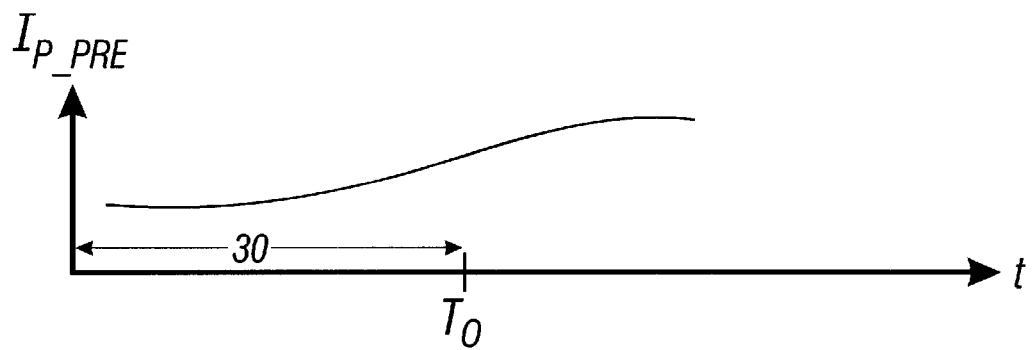
FIGS. 4, 5, 6, 7, 8 9, 10, 11 and 12 are illustrations of exemplary time-varying pixel intensities.
Figure 5:
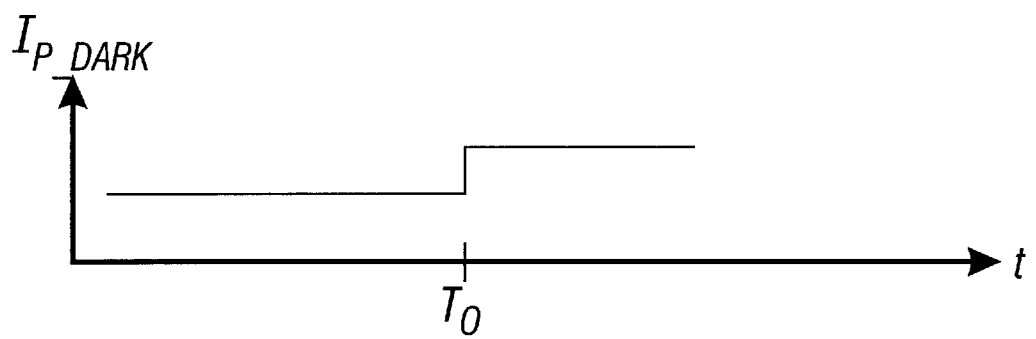
Figure 6:
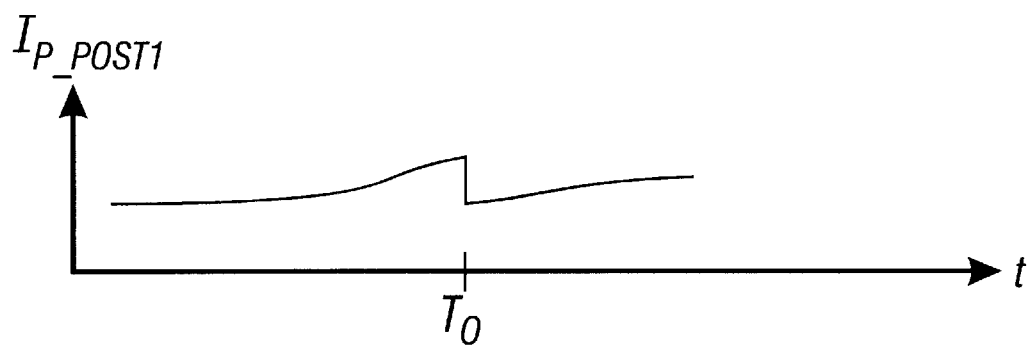

For example, referring to FIG. 4, for a given pixel to be displayed on a monitor (not shown), a pixel intensity (called $I_{P\_PRE}$) of that pixel may generally increase during one of the intervals 30 as each video frame 26 is received and the $I_{P\_PRE}$ pixel intensity is updated. To compensate for noise present in the $I_{P\_PRE}$ pixel intensity, a dark current noise pixel intensity (called $I_{P\_DARK}$ (see FIG. 5)) that is provided by the noise frame 24 may be used. For example, the $I_{P\_DARK}$ pixel intensity may be provided by a corresponding pixel of the noise frame 24. However, because, in some embodiments, the noise frame 24 is received once every interval 30, the level of the $I_{P\_DARK}$ pixel intensity is also updated once every interval 30. In this manner, because the dark current noise may change over the current interval 30, the $I_{P\_DARK}$ pixel intensity may abruptly change (at time $T_0$) near the start of the next interval 30 when the next noise frame 26 is received. As a result, referring to FIG. 6, if a noise compensated pixel intensity (called $I_{P\_POST1}$) is set equal to $I_{P\_PRE}$ less $I_{P\_DARK}$, the $I_{P\_POST1}$ pixel intensity may abruptly change at the beginning of the interval 30. Thus, for example, the displayed pixel may suddenly darken.

Figure 7:
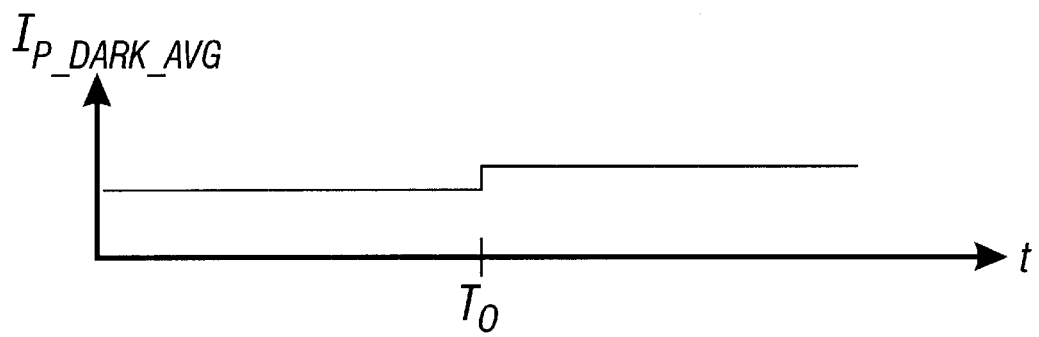
Figure 8:
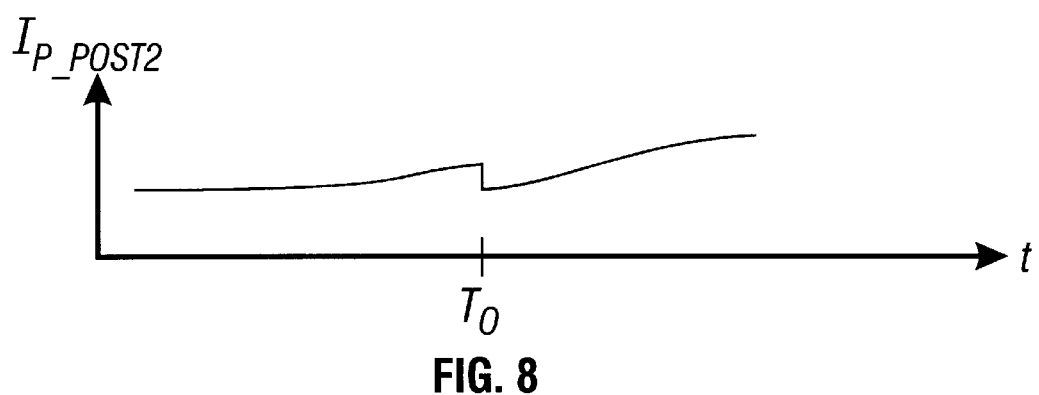

To prevent abrupt transitions in the intensities of the pixels, the noise reduction routine 28 may cause the computer 22 to dampen otherwise abrupt changes in the $I_{P\_DARK}$ pixel intensity. To accomplish this, in some embodiments, the computer 22 takes a rolling average of the $I_{P\_DARK}$ pixel intensity to generate an average dark current noise intensity (called $I_{P\_DARK\_AVG}$ (see FIG. 7)) which is used in place of the $I_{P\_DARK}$ pixel intensity for compensation. In this manner, the computer 22 subtracts the $I_{P\_DARK\_AVG}$ pixel intensity from the $I_{P\_PRE}$ pixel intensity to generate a pixel intensity (called $I_{P\_POST2}$ (see FIG. 8)). As an example, the $I_{P\_DARK\_AVG}$ pixel intensity may be a rolling average of all of the intensities that are indicated by two consecutive noise frames 24. This averaging smoothes out the otherwise abrupt transitions in the dark current noise intensities that are used for compensation.

Figure 9:
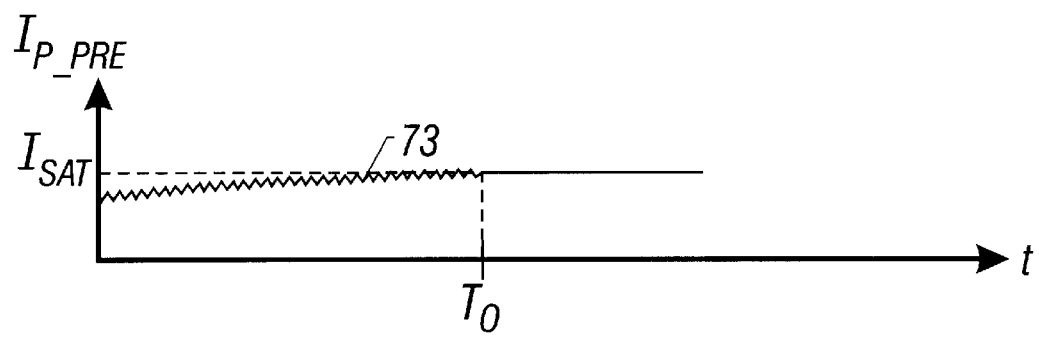
Figure 10:
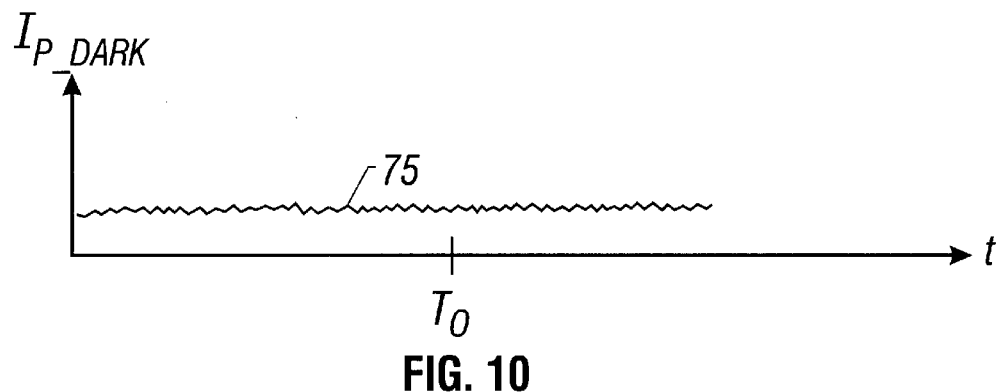
Figure 11:
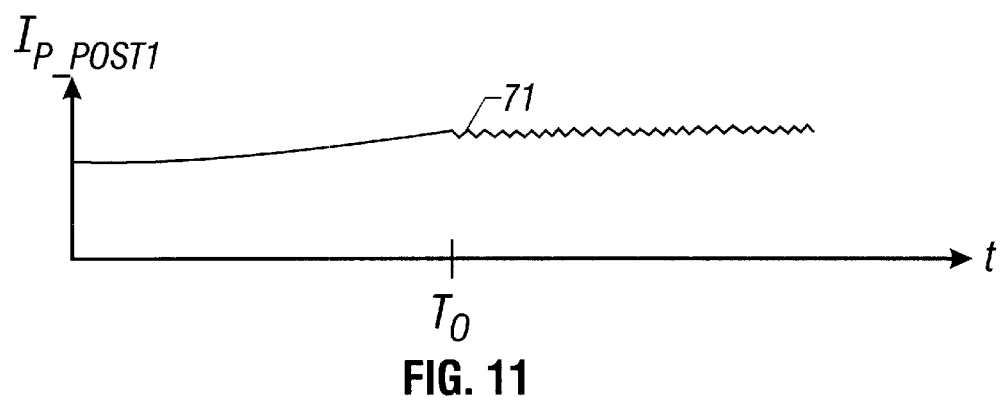

Referring to FIG. 9, using the noise frames 24 may present another problem when the $I_{P\_PRE}$ pixel intensity reaches and stays at its maximum level (called $I_{SAT}$), i.e., when the $I_{P\_PRE}$ pixel intensity saturates. When this occurs, the $I_{P\_POST1}$ pixel intensity may exhibit a slight noise ripple 71 (see FIG. 11) due to reasons described below. This is different from the non-saturated case when both the $I_{P\_PRE}$ and $I_{P\_DARK}$ pixel intensities have slight ripples 73 and 75, respectively (see FIGS. 9 and 10) which cancel each other when the difference of the two intensities is taken. However, when the $I_{P\_PRE}$ pixel intensity saturates, the $I_{P\_PRE}$ pixel intensity does not have a ripple component to substantially cancel the ripple component 75 present in the $I_{P\_DARK}$ intensity.

Figure 12:
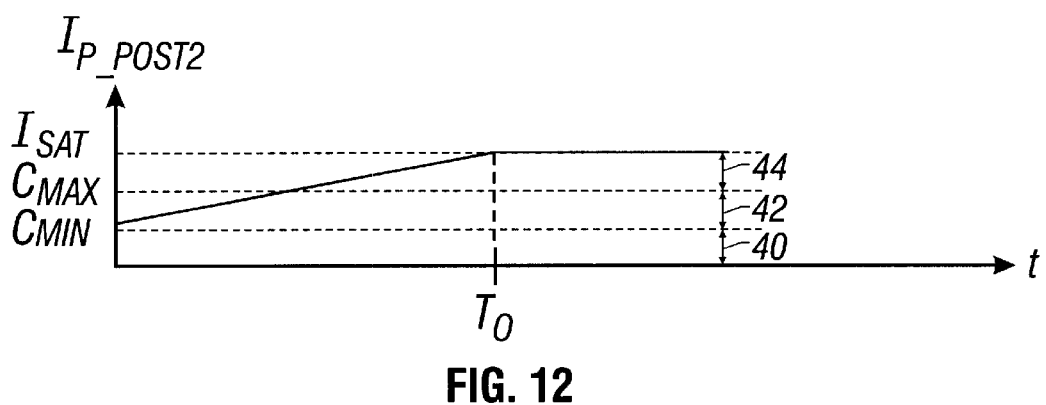

To prevent this problem from occurring during saturation, in some embodiments, when the $I_{P\_PRE}$ pixel intensity approaches the $I_{SAT}$ threshold, the routine 28 causes the computer 22 to set the $I_{P\_POST}$ pixel intensity substantially equal to the difference between the $I_{P\_PRE}$ and $I_{P\_DARK\_AVG}$ pixel intensities (see FIG. 12). To accomplish this, in some embodiments, the routine 28 may cause the computer 22 to base the calculation of the $I_{P\_POST2}$ pixel intensity on which domain 40, 42 or 44 the $I_{P\_PRE}$ pixel intensity falls into.

In the lowest domain 40 (in which the $I_{P\_PRE}$ pixel intensity is less than a predetermined threshold called $C_{MIN}$), the routine 24 causes the computer 22 to set the $I_{P\_POST2}$ pixel intensity equal to the difference of the $I_{P\_PRE}$ and $I_{P\_DARK}$ pixel intensities. In the intermediate domain 42 (in which the $I_{P\_PRE}$ pixel intensity is between the $C_{MIN}$ threshold and an upper predetermined threshold called $C_{MAX}$), the routine 28 causes the computer 22 to set the $I_{P\_POST\_2}$ pixel intensity equal to the difference between the $I_{P\_PRE}$ pixel intensity and a weighted combination of the $I_{P\_DARK\_AVG}$ average pixel intensity and the $I_{P\_DARK}$ pixel intensity. In the highest domain 44 (in which the $I_{P\_PRE}$ pixel intensity is between the $C_{MAX}$ threshold and the saturation threshold $I_{SAT}$) the routine 28 causes the computer 22 to set the $I_{P\_POST2}$ pixel intensity equal to the difference between the $I_{P\_PRE}$ intensity and the $I_{P\_DARK\_AVG}$ average pixel intensity. Thus, the $I_{P\_DARK\_AVG}$ pixel intensity is used when $I_{P\_PRE}$ saturates, as the $I_{P\_DARK\_AVG}$ pixel intensity exhibits minimal ripple. A possible conversion of the $I_{P\_PRE}$ pixel intensity to the $I_{P\_POST2}$ pixel intensity which addresses the above-stated problems may be described by the following pixel point equation:

$$I_{P\_POST} = I_{P\_PRE}$$

$$-(I_{P\_DARK\_AVG} +$$

$$(I_{P\_DARK} - I_P$$

$$-_{DARK\_AVG}) \cdot \alpha$$

$$(I_{P\_PRE}), \text{ where}$$

$$I_{P\_DARK\_AVG}$$

$$= A_{AVG} \cdot I_{P\_DARK}$$

$$-_{AVG\_CURR} +$$

$$(1-A_{AVG}) \cdot I_P$$

$$-DARK\_AVG\_PREV,$$

$$\alpha(I_{P\_PRE}) = e^{\frac{-D(I_{P\_PRE} - C_{MIN})}{C_{MAX} - C_{MIN}}},$$

if $C_{MIN} > I_{P\_PRE} > C_{MAX}$, $\alpha(I_{P\_PRE})=1$, if $I_{P\_PRE} < C_{MIN}$, $\alpha(I_{P\_PRE})=0$, if $I_{P\_PRE} > C_{MAX}$, $A_{AVG}$ is an averaging constant, D is a constant, $I_{P\_DARK\_AVG\_CURR}$ is the average pixel intensity of all pixels of the current noise frame 24, and $I_{P\_DARK\_AVG\_PREV}$ is the average pixel intensity value of all pixels of the previous noise frame 24.

In other embodiments, $(I_{P\_PRE})$, for $I_{P\_PRE}$ between $C_{MIN}$ and $C_{MAX}$, may be represented by the following equation:

$$\alpha(I_{P\_PRE}) = \frac{K}{1 + eM \cdot (I_{P\_PRE} - A)},$$

where K, A and M are constants.

Figure 13:
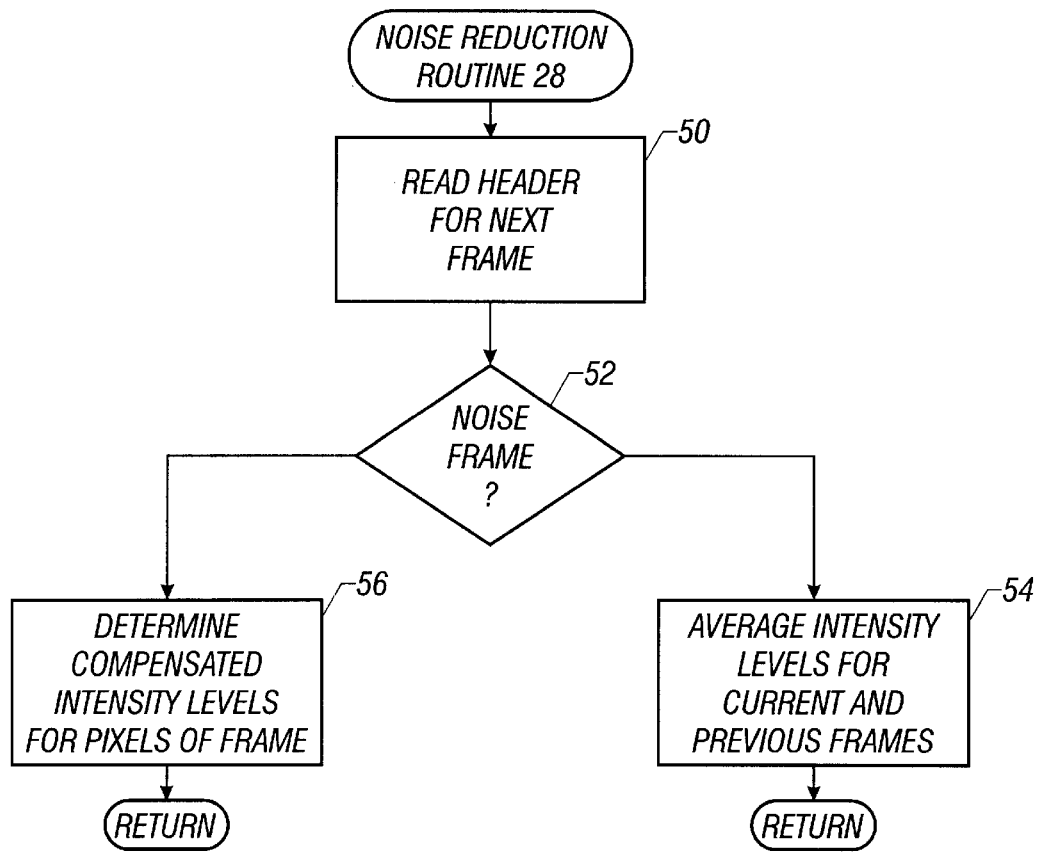
FIG. 13 is a flow diagram illustrating an algorithm executed by the computer to reduce dark current noise.

Referring to FIG. 13, in some embodiments, the noise reduction routine 28 may cause the computer 22 to read (block 50) a header from the next received frame and determine (diamond 52) whether the frame is a noise frame 24. If the frame is a noise frame 24, the routine 28 may cause the computer 22 to average (block 54) the intensities of the noise frame 24 to update the $I_{P\_DARK\_AVG}$ intensity and then return from execution of the routine 28.

Otherwise, the frame is a video frame 26, and the routine 28 causes the computer 22 to apply the above stated formula to determine (block 56) the compensated intensity values for each pixel of the frame 26.

Figure 14:
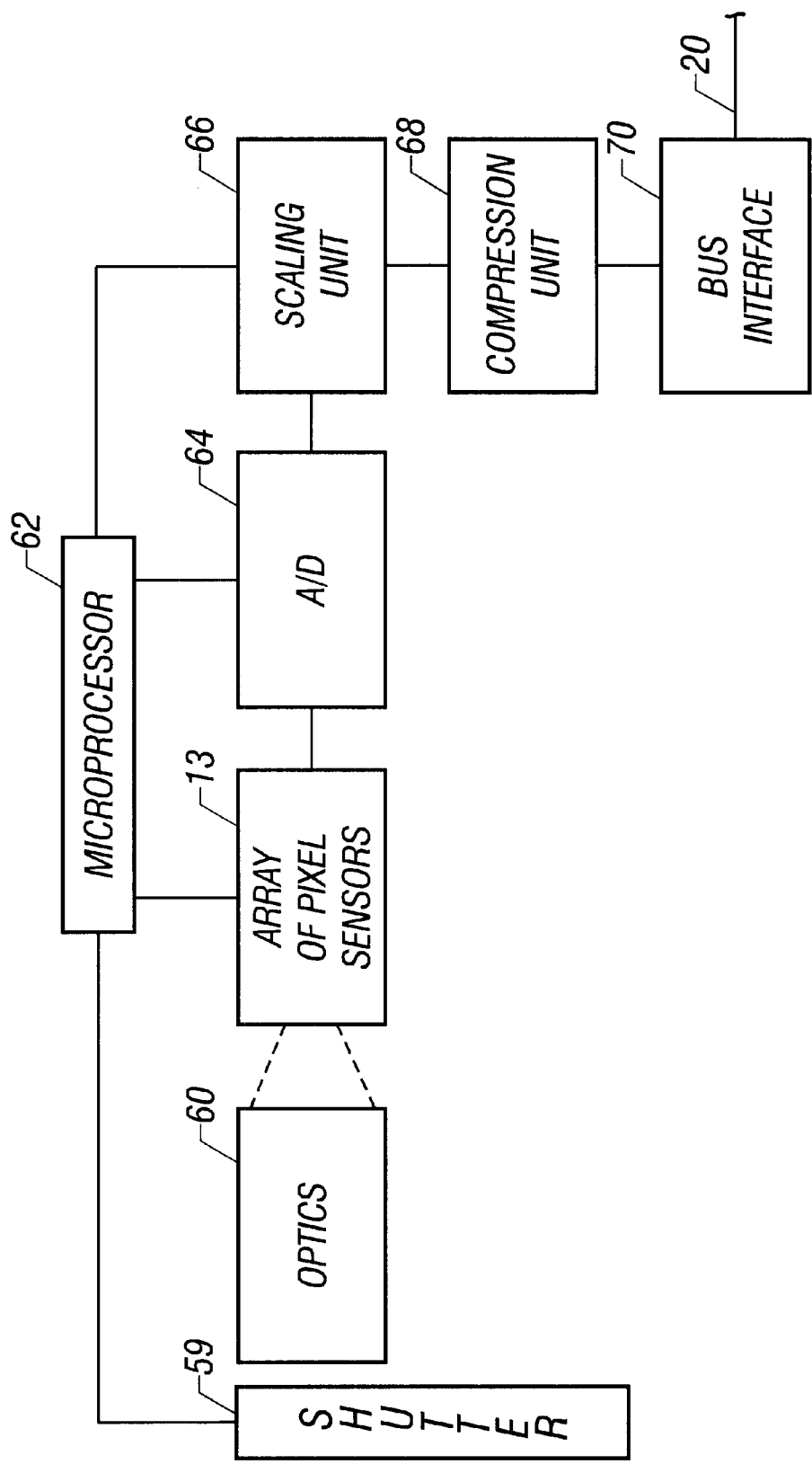
FIG. 14 is a block diagram of the camera of FIG. 2.

Referring to FIG. 14, besides the pixel sensors 13, the camera 18 includes optics 60 which form an image on the pixel sensors 13. A lens of the optics 60 may also be used to focus the camera 18 to infinity to form the noise frame 24. The camera 18 may also include a shutter 59 which may be used to shut off light from the optics 60 to form the noise frame 24.

The pixel sensors 13 furnish analog signals which are converted into a digital format via an analog-to-digital (A/D) converter 64. The camera 18 may also include a scaling unit 66 that, for example, may scale down the resolution of the transmitted image before communicating it to the bus 20. The camera 18 may also include a compression unit 68 and a bus interface 70 to interact with the bus 20. To coordinate activities of these units of the camera 18, the camera may include a microprocessor 62 which, among other things, may interact with the optics 60 to focus the camera 18 and interact with shutter 59 to open and close the shutter 59. The microprocessor 62 may periodically receive an interrupt request which causes the microprocessor to take actions which cause generation of the noise frame 24, i.e., causes the microprocessor 62 to momentarily focus the lens of the optics 60 to infinity or close the shutter 59.

Figure 15:
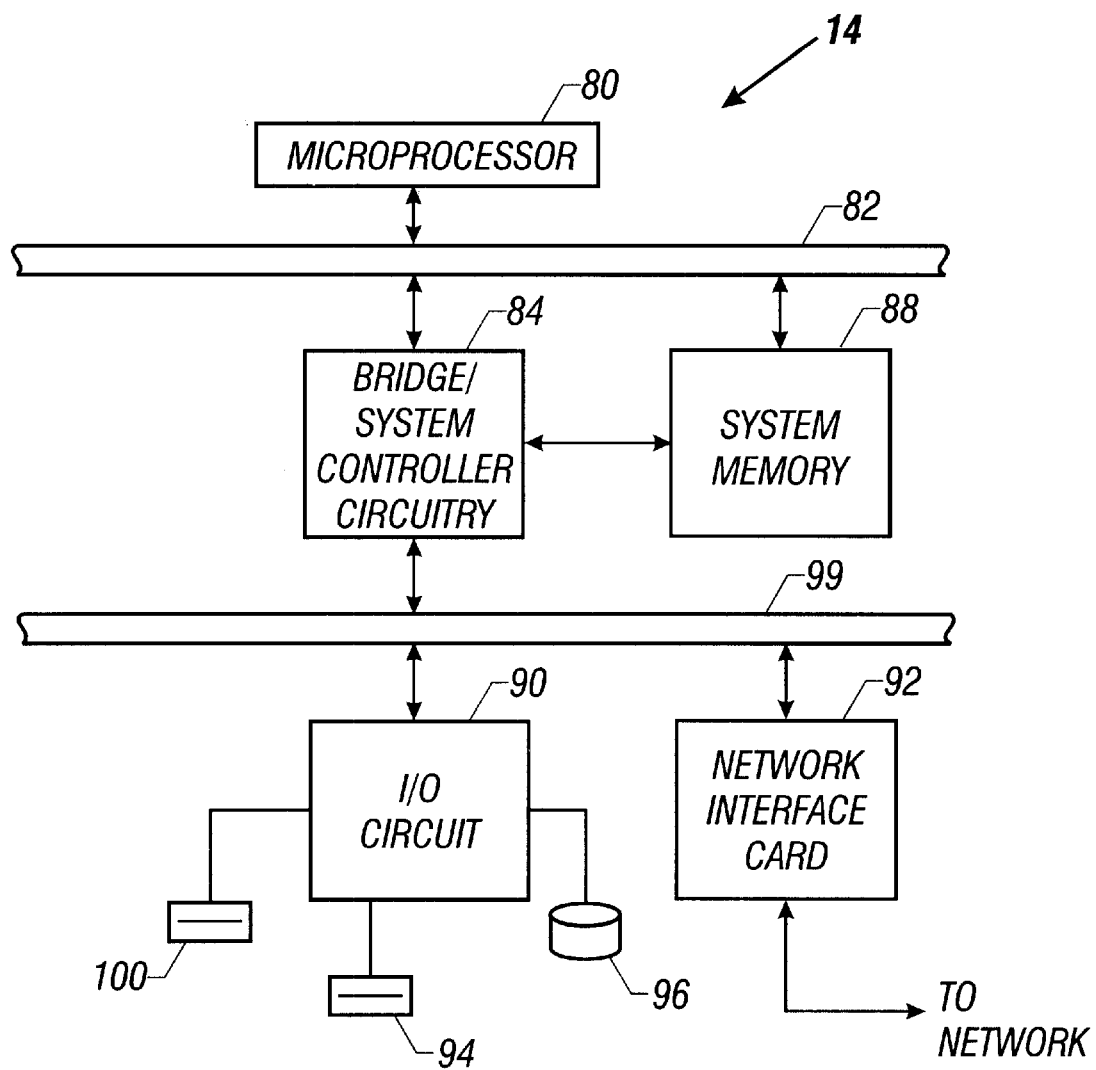
FIG. 15 is a block diagram of the computer of FIG. 2.

Referring to FIG. 15, in some embodiments, the computer 14 might include a microprocessor 80 which executes a copy of the noise reduction routine 28 which is stored in a system memory 88. The routine 28 configures the microprocessor 80 to use the noise frame 24 to compensate for the noise in the video frames 26. The memory 88, the microprocessor 80 and bridge/system controller circuitry 84 are all coupled to a host bus 82. The circuitry 84 also interfaces the host bus 82 to a downstream bus 99 which is coupled to an I/O controller 90 and a network interface card 92, as examples. The computer 14 may also have, as examples, a CD-ROM drive 100, a floppy disk drive 94 and/or a hard disk drive 96.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A computer system comprising:

a processor; and a memory storing a program to cause the processor to:

receive a stream of video and noise frames from a camera, the stream including nonoverlapping time intervals and each nonoverlapping time interval including one of the noise frames and a different group of the video frames, average data from at least two of the noise frames together as the noise frames are received to update pixel intensity adjustment data, and for each nonoverlapping time interval, use the pixel intensity adjustment data to compensate pixel intensities indicated by the associated group of video frames.

2. The computer system of claim 1, wherein the program causes the processor to substantially remove dark current noise from the associated group of video frames.

3. The computer system of claim 1, wherein the intervals have uniform durations of time.

4. The computer system of claim 1, wherein the program causes the processor to use the video frames to form a video on a display of the computer.

5. The computer system of claim 1, wherein the camera automatically generates the noise frames.

6. A method comprising:

receiving a stream of video and noise frames from a camera, the stream including nonoverlapping time intervals and each nonoverlapping time interval including one of the noise frames and a different group of the video frames, averaging data from at least two of the noise frames together as the noise frames are received to update pixel intensity adjustment data; and for each nonoverlapping time interval, using the pixel intensity adjustment data to compensate pixel intensities indicated by the associated group of video frames.

7. The method of claim 6, further comprising:

substantially removing dark current noise from the associated group of video frames.

8. The method of claim 6, wherein the intervals have uniform durations of time.

9. The method of claim 6, further comprising:

using the video frames to form a video on a display of the computer.

10. The method of claim 6, further comprising:

automatically generating the noise frames.

* * * * *